United States Patent Office 3,183,683
Patented May 18, 1965

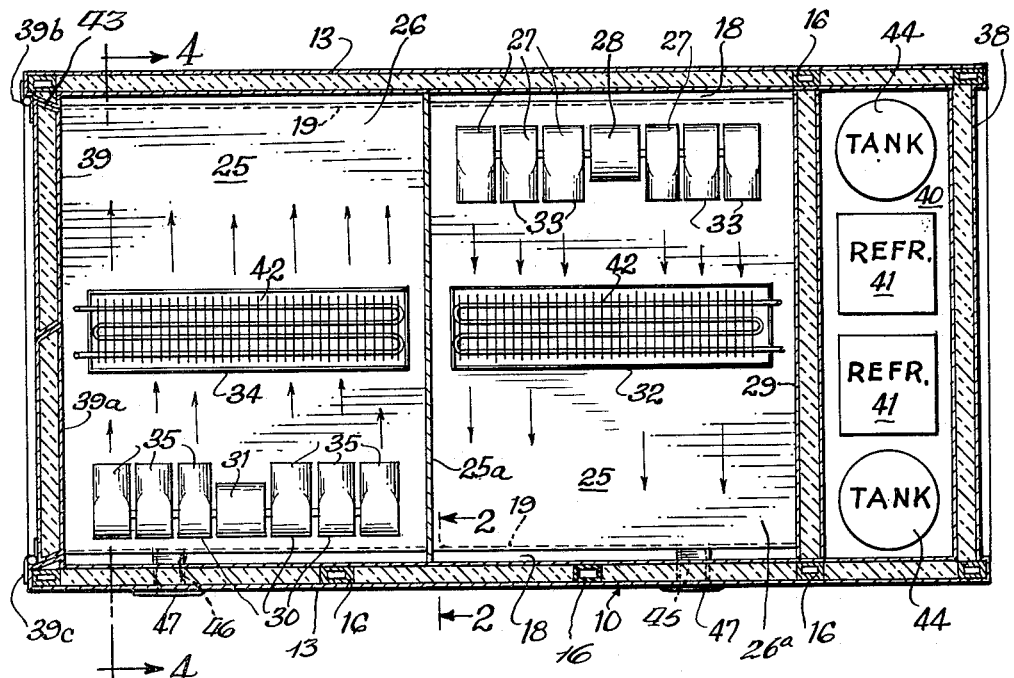

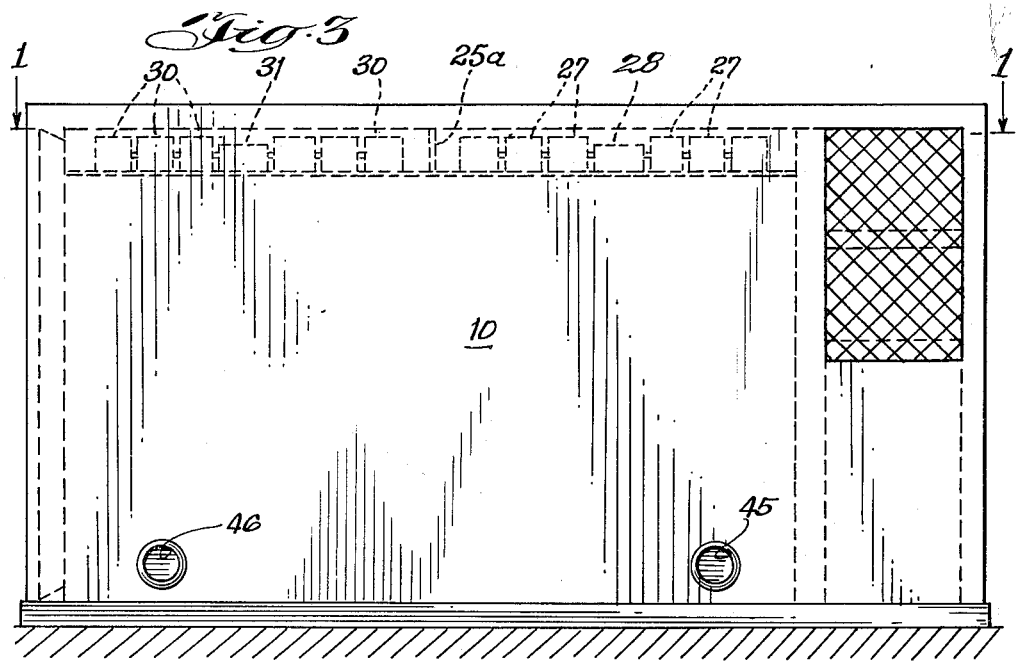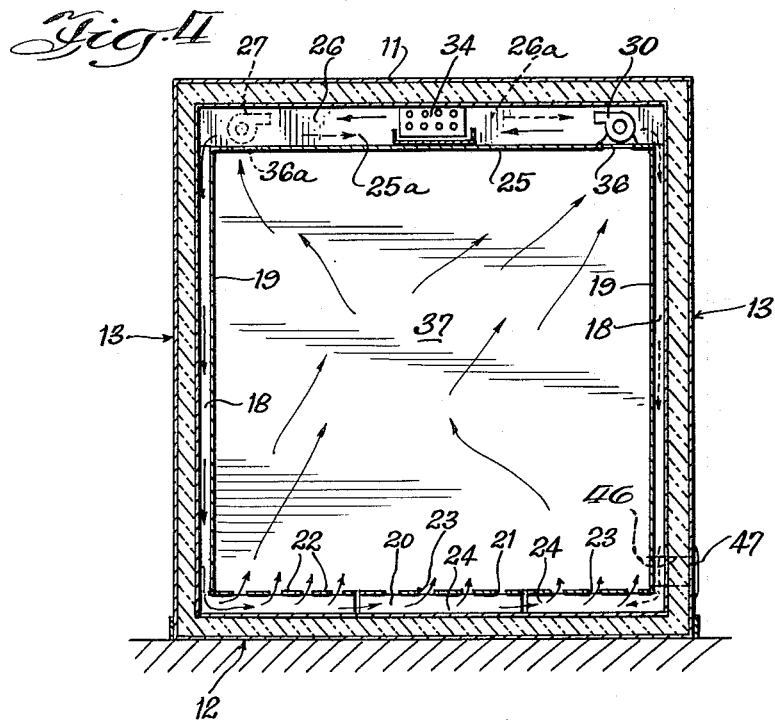

1

3,183,683
STORAGE UNIT FOR PERISHABLE MATERIALS
Alexander L. Reiter, St. Joseph, and Marvin A. Fuller, Benton Harbor, Mich., assignors to Whirlpool Corporation, a corporation of Delaware
Filed Oct. 17, 1963, Ser. No. 316,991
7 Claims. (Cl. 62—411)

This invention relates to a storage unit for perishable animal and plant materials, and particularly to such a storage unit that may be transported to the harvest field or orchard when the materials are harvested, loaded at the point of harvest and then transported to a destination while maintaining a controlled preserving atmosphere within the storage unit.

In Bedrosian and Broady Patent 3,102,777, assigned to the same assignee as the present application, there is disclosed and claimed an apparatus and method for storing perishable animal and plant materials in an enclosure including means for supplying a storage atmosphere to the storage space within the container in which the atmosphere includes an amount of oxygen less than that found in normal air to retard but not prevent the progress of the aging respiratory change equation and an amount of carbon dioxide greater than that found in normal air also to retard but not prevent the progress of this equation. In the preferred conditions, this amount of oxygen is about 1–10% by volume of the atmosphere, the amount of carbon dioxide is about 0.5–6 times the amount by volume of oxygen with the preferred amount being about 1–15% by volume and the remainder of the atmosphere being inert gases such as nitrogen. Under still more preferred conditions the relative humidity of this atmosphere within the container is about 25–100% and the temperature of the atmosphere is about 29–120° F.

In the copending application of Fuller et al. Serial No. 317,004, filed October 17, 1963, also assigned to the same assignee, there is disclosed and claimed an apparatus for generating a preserving atmosphere of this type with the apparatus being so constructed that it lends itself to ready portability so that it can be moved to the location where needed.

The invention of the present application is concerned with a storage unit which also lends itself to ready portability.

One of the features of this invention therefore is to provide an improved storage unit for perishable animal and plant materials in which a contained storage or preserving atmosphere for the materials is circulated over the stored materials.

Another feature of the invention is the provision of such a storage unit in which means are provided as a part of the unit itself for substantially continually replenishing the atmosphere in the storage space where the animal or plant materials being stored are located.

Still another feature of the invention is to provide an improved atmosphere circulation system.

Yet another feature of the invention is to provide such an apparatus in which the storage unit also contains refrigerating means for chilling the atmosphere and adjusting the moisture content of the atmosphere to produce the conditions described above.

Other features and advantages of the invention will be apparent from the following description of one embodiment thereof as illustrated in the accompanying drawings. Of the drawings:

FIGURE 1 is a sectional plan view of the interior of a storage unit embodying the invention and taken substantially along line 1—1 of FIGURE 3.

FIGURE 2 is an enlarged fragmentary vertical sectional view through a side wall of the unit of FIGURE 1 and taken substantially along line 2—2 of FIGURE 1.

FIGURE 3 is a side elevational view of the unit of FIGURE 1 with certain interior portions shown in broken lines.

FIGURE 4 is a vertical sectional view taken substantially along line 4—4 of FIGURE 1.

FIGURE 5 is an enlarged fragmentary horizontal sectional view taken substantially along line 5—5 of FIGURE 2.

The storage unit 10 shown in the accompanying drawings is easily portable and can be loaded at the source with the perishable animal or plant materials in that the unit can be readily transported by any means desired, such as truck, railroad car, ship or any combination of these, to and from the place of loading. Thus, where the material to be stored and preserved is a plant the unit may be moved and loaded at the orchard, field or other place of growth. Where the material is animal the unit may be loaded where the animal material is processed. The loaded unit with the stored materials subjected to the storage atmosphere within the unit may then be transported to the destination of the stored material.

The storage unit is made up of top 11, bottom 12 and side 13 walls which are insulated. A typical wall, here a side wall 13, is illustrated in FIGURES 2 and 5 as being made up of spaced parallel sheets 14 of fiberglass having an intermediate layer 15 of insulating material such as foamed polystyrene or foamed polyurethane. This combination of foamed insulation and sheet fiberblass results in a very lightweight construction. In order to give strength, there is provided a plurality of spaced steel structural members 16 (FIGURE 1) of rectangular cross section which are located between sheets 14 and within foam layer 15. There are also provided spaced aluminum channel supports 17 which are attached to the inner surfaces of side walls 13 by suitable attaching means (not shown). Supports 17, in turn, support a plastic duct or conduit member 19 which defines a duct or conduit space 18. As can be seen in FIGURE 5, each conduit member is of channel shape and adjacent ones are arranged with overlapping edges attached to a support 17 as by rivets 17a.

A bottom duct space 20 is provided between the bottom wall 12 and communicating with the two side duct means 18. The bottom duct space 20 is defined by a false floor 21 made up of longitudinally extending spaced slats of wood or metal 22 spaced apart to provide atmosphere openings 23. These slats 22 are supported by parallel cross slats 24, as illustrated in FIGURE 4.

The top of the unit beneath the top wall 11 is provided with a false ceiling 25 spaced from the top wall 11 and a vertical divider wall 25a to provide chambers 26 and 26a on opposite sides of wall 25a which also serve as ducts or conduits for the atmosphere. The opposite sides of the chambers 26 and 26a are in communication with the tops of the side ducts 18 that are adjacent the side walls 13.

The chambers 26 and 26a each contain atmosphere circulating and atmosphere cooling means as shown in FIGURES 1 and 4. Thus, at one end of chamber 26a (FIGURE 4) adjacent a side wall 13 there is positioned an aligned series of blowers 27 (FIGURE 1) all driven by a single motor 28. The blowers 27 and motor 28 combination is positioned adjacent the juncture of a side wall 13 and a partition wall 29. In chamber 26a on the opposite side of wall 25a there is positioned another series of blowers 30 driven by motor 31. This series is arranged opposite to blowers 27 in that each series of blowers 30 blows air toward the opposite wall 13 so that the two sets of blowers 27 and 30 force air across chambers 26 and 26a in opposite directions.

In order to cool the air that is circulated by blowers 27 and 30 there is provided a first refrigerant evaporator coil open structure 32 arranged in chamber 26a opposite the outlets 33 from the blowers 27 so that the atmosphere from these blowers must pass through the evaporator structure 32 in order to be cooled and dried. A similar evaporator structure 34 arranged in chamber 26 is located opposite the outlets 35 from the other set of blowers 30 so that the atmosphere from these outlets is likewise forced through the evaporator structure 34 in order to cool the air and condense moisture therefrom. Each of the blowers 27 has an inlet 36 in the false ceiling 25, while each blower 30 has a similar inlet 36a (FIGURE 4).

With this arrangement the blowers draw the storage atmosphere from the storage space 37 within the unit 10, blows it across and through the respective evaporator structure 32 or 34, forces the cooled atmosphere down the respective side ducts 18 and into the bottom passage 20 where the storage atmosphere then passes upwardly through the openings 23 in the false floor 21 to again enter the storage chamber 37. From here the atmosphere is again drawn into the blowers 27 and 30 for recirculation. During this continuous circulation the storage atmosphere passes around and in contact with the stored animal or plant materials (not shown) in the storage space 37. As is evident from FIGURES 1 and 4, the two sets of blowers 27 and 30 circulate the storage atmosphere in paths that pass in opposite directions from each other. Thus, when viewed as in FIGURE 4, blowers 27 tend to circulate the atmosphere clockwise, while blowers 30 tend to circulate the atmosphere counterclockwise. Although only 2 sets of blowers 27 and 30 are illustrated, it is of course obvious that more than 2 sets could be used, particularly for larger storage units.

The storage unit 10 is provided with an end wall 38 that is similar to the side walls 13. The opposite end wall is provided with doors 39 and 39a also constructed similarly to the side walls 13. As indicated in FIGURE 1, these doors 39 and 39a are hinged by hinges 39b and 39c so that the storage space 37 may be loaded with animal or plant materials as previously described.

The partition wall 29 previously described is spaced from the end wall 38 so as to provide a chamber 40. Located within this chamber 40 are a pair of refrigeration units 41 which in combination with the evaporator coils 42 of the structures 32 and 34 provide the means for cooling the circulating storage atmosphere. The refrigeration units are of the customary types and are connected to the evaporator coils 42 in the usual manner. Access openings (not shown) are provided in wall 38 for the installation and service of equipment in chamber 40.

The self-contained storage unit 10 is also provided with means for substantially continually replenishing the atmosphere in the storage space 37. Thus, atmosphere is permitted to leak out of the unit through the usual leakage cracks 43 and openings spaced around the doors 39 and 39a.

Then, in order to replace this escaping storage atmosphere the chamber 40 is provided with a plurality of high pressure tanks 44 which contain the storage atmosphere comprising oxygen, carbon dioxide and inert gases, as previously described, under high pressure. These tanks may be supplied with the preserving atmosphere by the apparatus disclosed in the above-mentioned copending Fuller et al. application.

After the storage space 37 has been filled to the desired degree with the animal or plant material which is to be preserved and doors 39 and 39a are moved to the closed positions, as shown in FIGURE 1, it is necessary to charge the space 37 with the preserving atmosphere. This is accomplished by providing spaced intake opening 45 and outlet opening 46 in a side wall 13 preferably adjacent the bottom thereof. The storage atmosphere is fed in through the intake opening 45 and this storage atmosphere may be generated by the apparatus disclosed in the copending Fuller et al. application. The refrigeration system 41 and motors 28 and 31 for the blowers are then started. As the atmosphere enters opening 45 it is distributed evenly through chamber 37. Also, the refrigeration system immediately begins to pull the field heat from the materials being stored.

The storage atmosphere is continually fed in through opening 45 until testing indicates that the carbon dioxide and oxygen contents within the space are at the desired levels. In the meantime, air within the space 37 is being swept out through the outlet opening 46. As soon as the desired storage atmosphere conditions prevail within the storage space 37 the introduction of atmosphere is stopped and the openings 45 and 46 are sealed as by means of expansible seals 47. At the same time the atmosphere is continually replenished by permitting a small portion to leak out of the unit as explained and this portion is replaced by atmosphere from the tanks 44.

The details of the piping connections between the evaporators 42 and the refrigeration units 41 are not shown, as these are purely conventional and form no part of the present invention. Similarly, the details of the piping connections from the tanks 44 and the details of the removable sealing plugs 47 are not shown as these likewise form no part of the present invention.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A storage unit for perishable animal and plant materials, comprising: wall means forming an enclosure having a storage space for said materials including side, bottom and top wall means, said storage space having an initial atmosphere; inlet means to said space for introducing a storage atmosphere into said space; outlet means from said space separated from said inlet means to cause said introduced storage atmosphere to sweep a portion of said initial atmosphere from said space and out the outlet means; means for sealing said inlet means and outlet means to provide a substantially confined atmosphere within said storage space; conduit means adjacent and substantially coextensive with said side, bottom and top wall means having an inlet thereto from said space and an outlet therefrom to said space to circulate said substantially confined atmosphere through said space by way of said conduit means; and fluid flow means in said conduit means to thusly circulate said substantially confined atmosphere.

2. A storage unit for perishable animal and plant materials, comprising: wall means forming an enclosure having a storage space for said materials, said storage space having an initial atmosphere; inlet means to said space for introducing a storage atmosphere into said space; outlet means from said space separated from said inlet means to cause said introduced atmosphere to sweep a portion of said initial atmosphere from said space and out the outlet means; means for sealing said inlet means and outlet means to provide a substantially confined atmosphere within said storage space; conduit means adjacent said wall means having an inlet thereto from said space and an outlet therefrom to said space to circulate said substantially confined atmosphere through said space by way of said conduit means; cooling means located substantially entirely within said conduit means for cooling said substantially confined atmosphere flowing through said conduit means and over said cooling means; and fluid flow means in said conduit means to thusly circulate said substantially confined atmosphere.

3. A portable storage unit for perishable animal and plant materials, comprising: top, bottom and side wall means forming an enclosure having a storage space for said materials, said storage space having an initial atmosphere; inlet means to said space for introducing a storage atmosphere into said space; outlet means from said space separated from said inlet means to cause said introduced atmosphere to sweep a portion of said initial atmosphere from said space and out the outlet means; means for sealing said inlet means and outlet means to provide a substantially confined atmosphere within said storage space; conduit means adjacent said wall means having an inlet thereto from said space and an outlet therefrom to said space to circulate said substantially confined atmosphere through said space by way of said conduit means, said conduit inlet being located adjacent the juncture of a top and side wall and said conduit outlet being located adjacent said bottom wall; fluid flow means in said conduit means to thusly circulate said substantially confined atmosphere; and cooling means located substantially entirely within said conduit means for cooling said substantially confined atmosphere flowing through said conduit means and over said cooling means, said cooling means being located in the portion of said conduit means that is adjacent said top wall.

4. The unit of claim 3 wherein said fluid flow means comprises a plurality of aligned blowers in said top wall means adjacent a juncture of a side and top wall and each having an inlet communicating with said storage space adjacent said juncture and an outlet directed across said top wall conduit toward the opposite side thereof.

5. The unit of claim 3 wherein said fluid flow means comprises two sets of blowers with each set including a plurality of aligned blowers in said top wall means adjacent a juncture of a side and top wall and each having an inlet communicating with said storage space adjacent said juncture and an outlet directed across said top wall conduit toward the opposite side thereof, the two sets of blowers circulating the atmosphere in opposite directions in said storage space.

6. The unit of claim 5 wherein cooling means are provided in the atmosphere flow path opposite said blower outlets.

7. The unit of claim 6 wherein said cooling means is located in said conduit means that is adjacent said top wall means.

References Cited by the Examiner
UNITED STATES PATENTS

| | | | |
|---|---|---|---|
| 270,549 | 1/83 | Linn | 62—78 |
| 2,095,780 | 10/37 | Willat | 62—78 |
| 2,123,678 | 7/38 | Madden | 62—405 |
| 2,272,543 | 2/42 | Bonsall | 62—290 |
| 2,869,336 | 1/59 | Smidl | 62—405 |
| 2,882,701 | 4/59 | Nelson | 62—405 |
| 3,092,979 | 6/63 | Lamont | 62—239 |

ROBERT A. O'LEARY, *Primary Examiner.*

WILLIAM J. WYE, *Examiner.*